United States Patent
Stefan

(10) Patent No.: US 10,496,389 B2
(45) Date of Patent: Dec. 3, 2019

(54) FIELD DEVICE

(71) Applicant: Schneider Electric Industries SAS, Rueil-Malmaison (FR)

(72) Inventor: Iulia Dana Stefan, Marktheidenfeld (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 24 days.

(21) Appl. No.: 15/224,748

(22) Filed: Aug. 1, 2016

(65) Prior Publication Data

US 2017/0039057 A1 Feb. 9, 2017

(30) Foreign Application Priority Data

Aug. 3, 2015 (EP) ..................................... 15306259

(51) Int. Cl.
*G06F 9/44* (2018.01)
*G06F 8/65* (2018.01)
*G05B 19/042* (2006.01)
*G05B 19/05* (2006.01)

(52) U.S. Cl.
CPC ............. *G06F 8/65* (2013.01); *G05B 19/042* (2013.01); *G05B 19/05* (2013.01); *G05B 19/056* (2013.01); *G05B 2219/25066* (2013.01); *G05B 2219/25068* (2013.01); *G05B 2219/25112* (2013.01); *G05B 2219/25428* (2013.01)

(58) Field of Classification Search
None
See application file for complete search history.

(56) References Cited

U.S. PATENT DOCUMENTS 7,055,148 B2 * 5/2006 Marsh ........................ G06F 8/65
713/2
8,737,981 B2 * 5/2014 Jacobs .............. H04M 1/72525
455/403

(Continued)

FOREIGN PATENT DOCUMENTS

WO 2005036358 A2 4/2005
WO 2014095411 A1 6/2014

OTHER PUBLICATIONS

European Search Report dated Feb. 1, 2016 in Patent Application No. 15306259.1 (with English translation of categories of cited documents).

*Primary Examiner* — Insun Kang
(74) *Attorney, Agent, or Firm* — Oblon, McClelland, Maier & Neustadt, L.L.P.

(57) ABSTRACT

The invention relates to a field device for connection to a programmable logic controller having hardware comprising a processing unit, a memory and a data interface for communication with the programmable logic controller. The field device is characterized in that it is configured to receive compatibility information from the programmable logic controller by means of the data interface, wherein a firmware having a plurality of functions for operating the field instrument is stored in the memory, wherein the processing unit is configured to release a subset of the functions of the firmware for execution in dependence on the compatibility information to produce a behavior of the field device which is adapted to the compatibility information of the programmable logic controller.

13 Claims, 1 Drawing Sheet

(56) References Cited

U.S. PATENT DOCUMENTS

Figure 1:
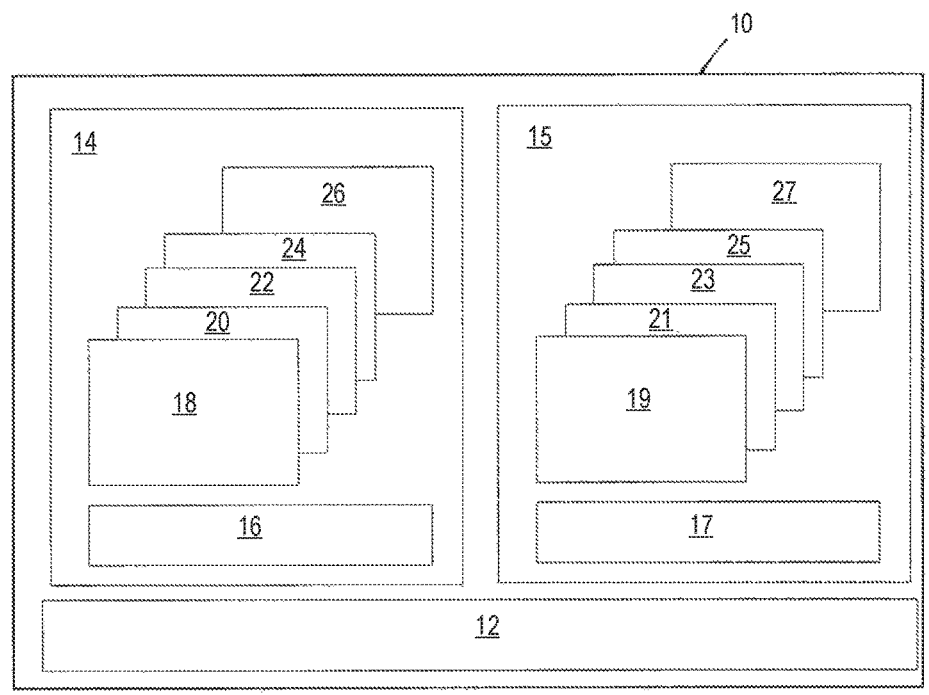

| | | | |
|---|---|---|---|
| 2004/0199899 A1* | 10/2004 | Powers | G06F 8/71 |
| | | | 717/120 |
| 2006/0218548 A1* | 9/2006 | Mason | G06F 8/61 |
| | | | 717/174 |
| 2007/0006213 A1* | 1/2007 | Shahidzadeh | G06F 21/57 |
| | | | 717/171 |
| 2008/0046710 A1 | 2/2008 | Maddocks et al. | |
| 2008/0196008 A1* | 8/2008 | Branton | G06F 8/65 |
| | | | 717/120 |
| 2008/0288933 A1* | 11/2008 | Budmiger | G01F 1/8431 |
| | | | 717/168 |
| 2009/0150020 A1* | 6/2009 | Przymusinski | F02D 41/2425 |
| | | | 701/31.4 |
| 2009/0265698 A1* | 10/2009 | Connolly | G06F 8/65 |
| | | | 717/168 |
| 2009/0282402 A1* | 11/2009 | Allocca | G06F 8/61 |
| | | | 717/176 |
| 2010/0146485 A1* | 6/2010 | Guertler | G06F 8/71 |
| | | | 717/124 |
| 2011/0022192 A1 | 1/2011 | Plache et al. | |
| 2013/0297928 A1 | 11/2013 | Wyss et al. | |
| 2014/0068597 A1* | 3/2014 | Hirahara | G06F 8/665 |
| | | | 717/173 |
| 2014/0237464 A1* | 8/2014 | Waterman | G06F 8/65 |
| | | | 717/172 |
| 2014/0300808 A1 | 10/2014 | Pan | |
| 2015/0193219 A1* | 7/2015 | Pandya | G06F 8/65 |
| | | | 717/171 |
| 2015/0309921 A1* | 10/2015 | Smith | G06F 21/00 |
| | | | 717/131 |
| 2015/0317151 A1* | 11/2015 | Falcy | H04L 67/28 |
| | | | 717/173 |
| 2016/0330082 A1* | 11/2016 | Bliss | H04L 41/22 |

* cited by examiner

FIELD DEVICE

The present invention relates to a field device, in particular to an actuator control, for connection to a programmable logic controller (PLC). The field device comprises hardware having a processing unit, a memory and a data interface for communication with the PLC.

Field devices are used in automated processes and can be configured, for example, as actuator controls, with electric motors and the like being controlled by means of the actuator controls. The field device can likewise be a sensor arrangement which detects measured values within the automated process. The automated processes can be used e.g. for producing components, with the programmable logic controller being able to control a plurality of field devices to monitor the production process.

When replacing a field device with newer models, the problem typically occurs that the newer model is equipped with firmware modified in comparison with the previous model. The modified firmware can, for example, provide different or amended functions, with a change in the extent of the functions being made possible, for example, by more powerful hardware of the new field device. The increased performance of the new field device can be achieved, for example, by a faster processor and/or by the availability of more memory storage space. The problem can occur in this respect that a PLC which controls the field device is not compatible with the modified firmware and/or the more powerful hardware of the new field device. The PLC therefore does neither "know" the new hardware, nor the new firmware of the field device.

If a field device is provided with new hardware (e.g. a new processor/a new processing unit) in the course of its product service life, the functionality of the firmware can be left unchanged, on the one hand, to ensure downward compatibility of the firmware. On the other hand, a new firmware version can be prepared which exploits the possibilities of the new hardware. This new firmware version may then, however, not be compatible without restriction with the previous firmware version.

As a result it is possible to choose between a plurality of variants of the field device having different firmware versions for the operation of the field device, with the selection between downward compatibility or the availability of new functions having to be made. If a change between these firmware versions is to be made later, a respective different version has to be loaded into the memory of the field device, with the field device subsequently having to be restarted (i.e. rebooted). Such a change between different firmware versions is therefore relatively time-consuming.

Software products which detect the existing hardware of the field device and supply it with the required compatible firmware are often used for the management of different firmware versions which are each compatible with different hardware versions. The organization and management effort for the correct association between the hardware and firmware in particular increases sharply for the case that a large number of firmware versions are available for different hardware versions of the field device. It may also be necessary to equip the PLC with different updates for the different hardware and firmware versions.

It is the underlying object of the invention to provide a field device which can be adapted to amended firmware demands with a small effort.

This object is satisfied by a field device in accordance with claim 1 and in particular in that the field device is configured to receive compatibility information and in that a firmware having a large number of functions for operating the field device is stored in the memory, with the processing unit being configured to release a subset of the functions of the firmware for execution in dependence on the compatibility information to produce a behavior of the field device which is adapted to the compatibility information.

In accordance with the invention, the field device comprises firmware which can also be called "compatibility firmware". The compatibility firmware can include functions which can both enable downward compatibility of the field device and fully utilize the performance of the hardware of the field device. This means that the firmware with a subset of the functions can map a behavior of the field device which corresponds, for example, to a preceding version of the field device or its firmware. A different subset of the functions of the firmware in turn allows the performance potential of the hardware of the field device to be utilized as much as possible even though these functions were not yet available or possible in preceding versions of the field device. The subsets can have some of their functions in common, i.e. the common functions form an intersecting set. The common functions can only be present once in the firmware, whereby storage space can be saved.

In other words, the functions of a plurality of preceding firmware versions can be combined in the compatibility firmware, for example the functions of preceding versions V1.0, V2.0, V3.0 and V4.0. Functions which are present in identical form in these versions can only be present once in the firmware. A selection can then be made by means of the compatibility information whether the field device should e.g. behave in accordance with V2.0 or V4.0.

For this purpose, a corresponding subset of the functions of the firmware can be selected and released for execution by means of the compatibility information.

The compatibility information can be transmitted, for example, from the PLC to the field device and can in particular be received at the field device via the data interface. Alternatively, the compatibility information can also be transmitted to the field device on the putting into operation of the field device, e.g. by means of a data memory (e.g. a USB stick).

If, for example, compatibility information is received via the data interface and the PLC instructs the field device by them to behave like a preceding version of the field device, that subset of the functions is selected and released for execution from the plurality of functions of the firmware which were already available in the preceding version of the field device. In this manner, the behavior of the earlier field device can be exactly mapped, in particular with respect to the behavior visible from the outside and/or with respect to the real time behavior. It is of advantage in this respect that, for example with certified production processes (e.g. in the pharmaceutical field), a completely new certification can be avoided on a replacement of the field device with a newer version.

Alternatively, the PLC can tell the field device by means of the compatibility information that the field device should make the latest functions of the compatibility firmware available. In such a case, a subset of the functions of the firmware is released for execution which comprises the respective current functions of the compatibility firmware which correspond to the version V4.0 in the above example. All the functions of the compatibility firmware can have the same real time behavior, which e.g. ensures a compatibility on data transmissions.

In accordance with the invention, the firmware of the field device therefore comprises more functions than conventional firmware of such a field device, which enables the execution of different subsets of the functions, whereby a different behavior of the field device can be produced.

The data interface can preferably be a fieldbus interface, e.g. a SERCOS 3 interface or a CAN (controller area network) interface.

Firmware is understood in accordance with the invention as a computer program which enables the use of the hardware of the field device. The firmware is in particular stored in a flash memory or in a ROM (read only memory—e.g. EPROM, EEPROM) and serves as an interface to software of the field device. The firmware can be loaded into a random access memory (RAM) on the start (booting) of the field device.

Due to the provision of all the functions which are required to produce the different behaviors of the field device by means of a single piece of firmware, a fast switchover between different subsets is enabled in the operation of the field device. The firmware of the field device in particular does not have to be reloaded; in addition, a restart or booting of the field device may not be required.

Different subsets of the functions of the firmware can therefore correspond to completely different (preceding) firmware versions of conventional firmware. It is thus possible by means of the field device in accordance with the invention to switch to and fro in a simple manner between different "firmware versions" (i.e. different subsets from the pool of all the functions of the field device which produce a different behavior of the field device). The necessity for additional tools which enable a correct association between hardware and firmware can thereby be dispensed with. A subset of the functions which has once been selected can be stored in the field device and can be used for so long until the field device is reconfigured by means of the compatibility information. The selected subset can in particular also continue to be used after a restart of the field device.

It is additionally of advantage that the test effort and validation effort for new firmware versions can be reduced. New functions can be simply integrated into the existing compatibility firmware, with the new functions being able to be assigned to a specific subset in dependence on the compatibility information. The new functions can therefore be released for execution by the compatibility information. This means that the compatibility firmware does not have to be completely retested and validated for the additional integration of new functions. It is rather sufficient to check the integration of the new functions.

The advantage further results that when field devices in accordance with the invention are used, automated systems can be operated unchanged over longer periods of time since the previous behavior of the field device can also continue to be produced even on changes to a field device (i.e. to its hardware or firmware) via the selection of a corresponding subset. A plurality of (conventionally required) firmware versions can in particular be mapped in the one compatibility firmware of the field device, for example, with the firmware being able to comprise all the functions of the preceding firmware versions (e.g. in addition to a version V4.0, also the mentioned versions V1.0, V2.0 and V3.0). A selection can then be made by means of the compatibility information as to which subset of the functions of the firmware is released for execution, whereby the behavior of any (desired) earlier firmware or firmware version can be emulated.

The user of the field device can therefore operate the field device in a compatibility mode which provides the behavior of an earlier firmware version or of an earlier field device. The user can likewise make a selection that the field device behaves like a newer version or the newest version (version V4.0 in the selected example). The user can use the field device in a versatile form in this manner. The field device is in particular not restricted to one compatibility mode, but can rather comprise a plurality of different compatibility modes. Each compatibility mode can use a predefined subset of all the functions of the compatibility firmware which corresponds to a specific earlier firmware version.

Preferred embodiments of the invention can be seen in the description, in the drawings and in the dependent claims.

In accordance with a first advantageous embodiment, the processing unit is configured to select the released functions such that the released functions can be controlled and utilized by means of the PLC. This means that functions are only released which are known to the PLC and which can accordingly also be used by the PLC. For this purpose, a list and/or a look-up table can be present in the field device in which the subset of the functions of the firmware matching respective compatibility information is stored.

In accordance with a further advantageous embodiment, the processing unit is configured to block non-released functions. An execution of the non-released functions is therefore prevented, whereby, for example, a certified behavior can be maintained. The processing unit can also be configured to recognize which functions the existing software of the field device supports and to exclude non-supported functions of the compatibility firmware from execution.

The processing unit is preferably configured to select the subset of the functions released for execution during the operation of the field device. The selection of the subset can consequently take place in the ongoing operation of the field device, i.e. without booting.

The processing unit is particularly preferably configured to change the subset of the functions released for execution during the operation of the field device. A switching can consequently be made between two different subsets in operation. A switching between different subsets can in this respect only take up a few milliseconds. This can enable a so-called "hot swap" function.

In accordance with a further advantageous embodiment, the compatibility information includes version information of the PLC. The version information can, for example, comprise hardware information, software information and firmware information of the PLC. The field device can determine which functions of the firmware of the field device are known to the PLC using the compatibility information and can release a corresponding subset of the functions for execution. The field device can, for example, determine that the PLC is five years old and that the firmware status had not been updated since the putting into operation. The field device can then release a subset of the functions of the firmware for execution in which all the function are at least five years old so that it is ensured that the PLC can also use all the released functions of the field device. It can moreover be ensured in this manner that the field device also corresponds to the behavior familiar to the PLC with respect to its behavior and timing, in particular with respect to its radio interfaces and its real time behavior.

In accordance with a further advantageous embodiment, the compatibility information includes a desired version of the field device. The PLC can tell the field device how it should act or which version of the field device it should emulate. A PLC which comprises a current firmware can, for example, instruct the field device to behave like a five-yearold field device, i.e. only to release those functions of the firmware for execution which had already existed five years beforehand.

All functions of the firmware preferably use the same firmware kernel. This means that all functions of the firmware are placed on the same kernel or are executed by the same kernel. It is of advantage in this respect that the kernel can also remain the same on the addition of new functions so that the test effort and validation effort on the addition of new functions can be considerably reduced. In addition, after the addition of new functions which are based on the same firmware kernel, the firmware is frequently only slightly larger (i.e. larger by a few percent than the previous firmware) since changes only apply to the new functions.

The costs and the effort for the implementation of new functions can also be considerably lowered with respect to the preparation of completely new firmware versions by the use of the same kernel.

In accordance with a further advantageous embodiment, all functions of the firmware use the same hardware abstraction layer (HAL). The hardware abstraction layer forms the link between the functions of the firmware and the hardware of the field device, with the hardware abstraction layer being able to be a component of the firmware. Different hardware versions of the field device can have different hardware abstraction layers, with the functions of the firmware, however, being able to remain unchanged. It can therefore be sufficient for changing the hardware of the field device only to modify the hardware abstraction layer accordingly. The development effort and the costs for the change of the hardware of the field device can be kept small in this manner.

A version number and/or a date is/are preferably associated with at least one, and in particular with each, of the functions of the firmware. The version number can indicate the version or revision of the field device from which a respective function originates. The time at which a respective function of the compatibility firmware was added or when the respective function was prepared can be determined using the date. The release of the functions can then in particular take place with reference to the version number and/or with reference to the date.

If it is, for example, requested by means of the compatibility information to adapt the behavior of the field device such that a five-year-old field device is emulated, those functions can be released in a simple manner which have a date which is at least five years in the past.

In accordance with a preferred embodiment, the processing unit is configured to release the functions by means of a conditional request and/or by means of a selection of an inheritance. The functions can be checked one after the other by means of if-then-else instructions, with the already named version number or a date, for example, being able to be utilized to select and release the respective function. Alternatively or additionally, object-oriented mechanisms can also be used, with a respective corresponding inheritance of a function in particular being selected and released with reference to the compatibility information.

All the steps which result in an execution of a subset of the functions of the compatibility firmware are therefore based on information, namely the compatibility information, which the field device receives from outside (e.g. from the PLC).

In accordance with a further advantageous embodiment, the processing unit is configured, for the case that none of the functions are suitable to produce a behavior of the field device adapted to the compatibility information, to download a further firmware and to continue the operation of the field device with the further firmware. This means, for the case that no suitable functions are present in the compatibility firmware, that further firmware can be downloaded. The further firmware can also be called performance firmware. The performance firmware can include functions which cannot be integrated into the compatibility firmware. The performance firmware can thus correspond to a version V5.0 in the previous example.

There can therefore be no constrains with respect to the optimization of real time capability and timing of the field device when preparing the performance firmware.

The performance firmware can in particular also be adapted to hardware of the field device which is particularly powerful.

If the processing unit therefore determines that the behavior of the field device requested by means of the compatibility information cannot be produced using the functions of the compatibility software, the performance firmware can be loaded into the field device using e.g. a bootloader.

The performance firmware can be loaded via a data link (e.g. Ethernet) from an external storage medium or from an internal memory of the field device.

After loading the performance firmware, the performance firmware can replace the compatibility firmware, for which purpose a restart (booting) of the field device is in particular necessary. The operation of the field device can subsequently be continued using the performance firmware.

The further firmware preferably only comprises further functions adapted to the hardware of the field device. In other words, the further functions of the performance firmware can be specifically developed for the hardware of the field device without having to take account of any constraints of earlier hardware versions. An optimum with respect to timing and to real time behavior of the field device can thus be achieved using the performance firmware.

The further functions can always be released for execution simultaneously, for example. This means that, unlike with the compatibility firmware, a release of only subsets cannot take place with the performance firmware. Alternatively, a release of subsets of the functions included in the performance software can also take place with the performance firmware.

In accordance with a further advantageous embodiment, the further firmware comprises a firmware kernel differing from the compatibility firmware and/or a different hardware abstraction layer. Current hardware of the field device can in particular be taken into account by means of the firmware kernel and the hardware abstraction layer, whereby constraints of e.g. the compatibility firmware can be eliminated.

The invention further relates to a method of connecting a field device to a programmable logic controller (PLC), wherein the field device comprises a firmware having a plurality of functions, wherein the field device receives compatibility information from the PLC by means of a data interface and wherein a subset of the functions of the firmware is released for execution in dependence on the compatibility information to produce a behavior of the field device which is adapted to the compatibility information of the PLC.

The invention also relates to a computer program having program code means which are adapted such that a method of the aforesaid kind is carried out when the program is executed on a field device. The computer program is the firmware.

The invention furthermore comprises a computer program product having program code means which are stored on a computer-readable data carrier and which are adapted such that a method of the above kind is carried out when the program product is executed on a field device.

In addition, the invention relates to a programmable logic controller (PLC) which comprises a data interface and which is configured to transmit compatibility information to a field device by means of the data interface to produce a behavior of the field device which is adapted to the compatibility information.

The invention further comprises a system having at least one field device and one PLC of the respective kind explained above.

Finally, the invention relates to a set of at least two field devices of the kind explained above, in which the field devices each comprise different hardware, but have the same functions for operating the field device. The firmware of the field devices of the set can in particular only differ in their hardware abstraction layers. The field devices can behave the same, viewed from the outside, by the selection of the same subset of functions.

The statements made with respect to the field device in accordance with the invention, in particular with respect to advantages and preferred embodiments, apply to the method in accordance with the invention, to the computer program in accordance with the invention, to the computer program product in accordance with the invention, to the PLC in accordance with the invention, to the system in accordance with the invention and to the set of these components in accordance with the invention.

Figure 2:
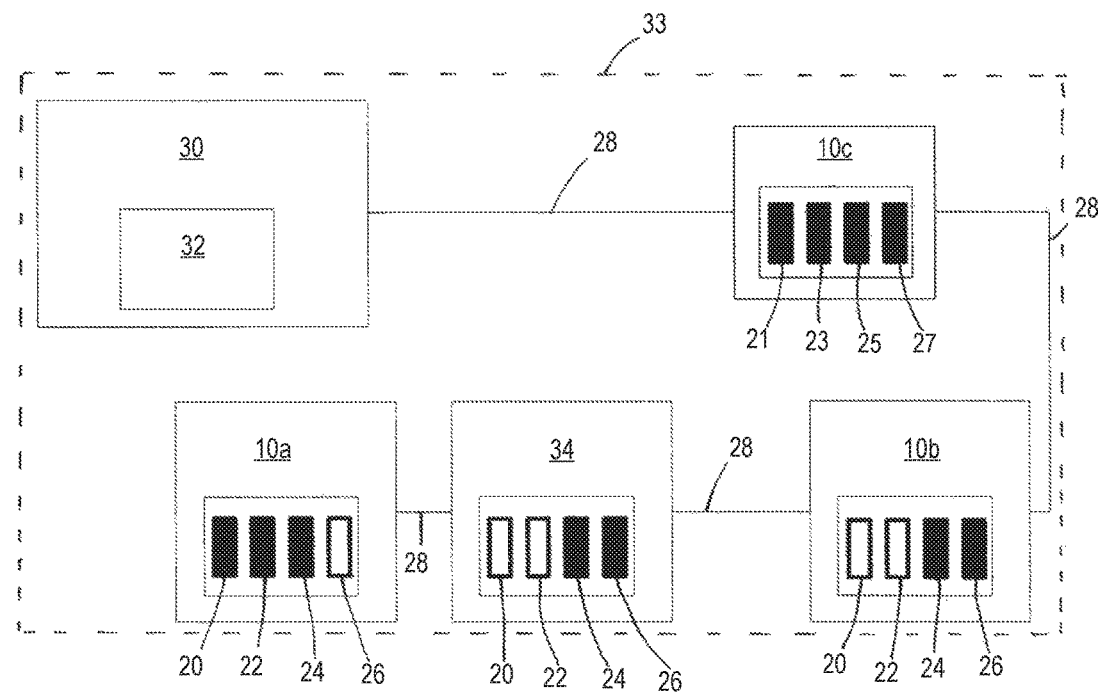

The invention will be described in the following purely by way of example with reference to the enclosed drawings. There are shown:

FIG. 1 the schematic structure of a field device in accordance with the invention; and FIG. 2 a programmable logic controller with a plurality of connected field devices in accordance with the invention.

FIG. 1 shows a field device 10 which is configured as a motor control (a so-called "drive"). The field device 10 has hardware 12 which comprises a processing unit The compatibility firmware 14 enables an electric motor (not shown) connected to the field device 10 to be operated. The field device 10 receives control commands by means of a data interface (likewise not shown) for operating the electric motor.

The compatibility firmware 14 comprises a hardware abstraction layer 16 which is adapted to the hardware 12. The compatibility firmware 14 furthermore comprises a kernel 18 which provides a basic functionality.

An advanced functionality of the compatibility firmware 14 is provided by a plurality of functions, with a first function 20, a second function 22, a third function 24 and a fourth function 26 being shown by way of examples in the Figures. The functions 20, 22, 24, 26 can serve, for example, to control complex movement processes of the electric motor in a simple manner.

The four functions 20, 22, 24, 26 allow the formation of a maximum of 15 subsets. The field device 10 can consequently map 15 different behaviors.

The third function 24 and the fourth function 26 were taken over from a field device which represents a predecessor of the shown field device 10 and whose hardware was less powerful than the shown hardware 12. The first function 20 and the second function 22 require the more powerful hardware 12 of the shown version of the field device 10.

Instead of the compatibility firmware 14, performance firmware 15 can also be loaded into the field device 10 by means of a bootloader (not shown) and can replace the compatibility firmware 14. The performance firmware 15 utilizes the hardware 12 ideally with respect to timing and real time capability.

The performance firmware 15 comprises an alternative hardware abstraction layer 17 and an alternative kernel 19. In addition, the performance firmware 15 comprises an alternative first function 21, an alternative second function 23, an alternative third function 25 and an alternative fifth function 27. The alternative functions 21, 23, 25, 27 are released for execution together.

FIG. 2 shows four field devices which are connected to a programmable logic control (PLC) 30 by means of a data link 28, e.g. by means of a fieldbus. The PLC 30 has PLC firmware 32 which is current PLC firmware 32. This means that the PLC firmware 32 is able to use the first, second, third and fourth functions 20, 22, 24, 26 as well as the alternative first, second, third and fourth functions 21, 23, 25, 27. The PLC 30 and the field devices form a system 33.

The field devices connected to the PLC 30 are a field device 10a, a field device 10b and a field device 10c which each have the same hardware 12 as the field device 10 shown in FIG. 1. A further field device 34 has older and less powerful hardware with respect to the field device 10 of FIG. 1.

The field devices 10, 10a, 10b, 34 comprise the same kernel 18 and the same functions 20, 22, 24, 26. The field device 10c comprises the performance firmware 15. The further field device 34 has a modified hardware abstraction layer 16 in comparison with the field devices 10, 10a, 10b due to its different hardware.

Those functions 20, 22, 24, 26 which are released for execution are shown filled black in FIG. 2. That is, the first, second and third functions 20, 22, 24 are released in the field device 10a. Only the respective third function 24 and the fourth function 26 are released in the field device 10b as well as in the further field device 34.

Such a release can, for example, be achieved in that the PLC 30 transmits compatibility information to the field device 10a which instruct the field device 10a to provide the latest functions 20, 22, 24.

The field device 10b and the further field device 34 have, in contrast, been instructed to provide that functionality which can be executed with the hardware of the further field device 34. Only the third and fourth functions 24, 26 are accordingly executed on the field device 10b and on the further field device 34.

The field device 10c can in this manner replace a field device which corresponds to the further field device 34 since the functionality of the field device 10b can correspond to such a field device. The behavior of a further field device 34 can be imitated by the field device 10b in this manner, for which purpose the field device 10b can be operated in a so-called compatibility mode. After such a replacement of an older field device, the field device 10b can advantageously seamlessly take over the function and the behavior of the older field device without modifications to the programming of the PLC 30. An interaction of a user is not necessary for this purpose; the PLC 30 likewise does not have to distinguish between newer field devices (the field devices 10a, 10b) and older field devices (the further field device 34).

The field device 10c has been instructed by the PLC 30 to download the performance firmware 15 by means of the data link 28 from a data store (not shown) and to use it. The field device 20c can utilize a maximum performance from the hardware 12 using the performance firmware 15.

REFERENCE NUMERAL LIST 10, 10a, 10b, 10c field device
12 hardware
14 compatibility firmware
15 performance firmware
16 hardware abstraction layer
17 alternative hardware abstraction layer
18 kernel
19 alternative kernel
20 first function
21 alternative first function
22 second function
23 alternative second function
24 third function
25 alternative third function
26 fourth function
27 alternative fourth function
28 data link
30 PLC
32 PLC firmware
33 system
34 further field device

The invention claimed is:

1. A field device for connection to a programmable logic controller (PLC), the field device having hardware, and the hardware comprising:
a processing circuitry,
a memory, and
a data interface for communication with the PLC,
wherein the field device is configured to receive compatibility information from the PLC;
wherein a firmware having a plurality of functions for operating the field device is stored in the memory; and
wherein the field device determines which functions of the firmware of the field device are known to the PLC using the compatibility information and the processing circuitry is configured to release only a subset of the functions of the firmware that is known to the PLC for execution during an operation of the field device without booting based on checking the received compatibility information one-by-one against a predetermined association of each of the plurality of the functions and a firmware version number or date that allows release of the function respectively, and preclude functions, other than the subset of the functions, that currently reside on the field device from execution, based on the compatibility information to produce a behavior of the field device which is configured to adapt to the compatibility information and adopt a function and behavior of the field device with an older version of the firmware to conform to the current programming of the PLC, when the compatibility information does not require all of the functions of the firmware, and wherein the processing circuitry is configured, if none of the plurality of functions is suitable to produce the behavior of the field device configured to adapt to the compatibility information, to download a further firmware and to continue the operation of the field device with the further firmware by releasing further functions of the further firmware for execution simultaneously.

2. The field device in accordance with claim 1, wherein the field device is an actuator control.

3. The field device in accordance with claim 1, wherein the processing circuitry is configured to select the subset of the released functions such that the subset of the released functions can be controlled and used by means of the PLC.

4. The field device in accordance with claim 1, wherein the processing circuitry is configured to select the subset of the functions released for execution during the operation of the field device.

5. The field device in accordance with claim 1, wherein the compatibility information includes version information on the PLC.

6. The field device in accordance with claim 1, wherein the compatibility information includes a desired version of the field device.

7. The field device in accordance with claim 1, wherein all of the plurality of functions of the firmware use the same firmware kernel.

8. The field device in accordance with claim 1, wherein all of the plurality of functions of the firmware have a hardware abstraction layer and all of the plurality of functions of the firmware use the same hardware abstraction layer.

9. The field device in accordance with claim 1, wherein at least one of a version number and a date is associated with at least one function of the plurality of functions of the firmware.

10. The field device in accordance with claim 1, wherein the processing circuitry is configured to release the subset of the functions by means of at least one of a conditional request and a selection of an inheritance.

11. The field device in accordance claim 1, wherein the further firmware only comprises further functions configured to adapt to the hardware of the field device.

12. The field device in accordance with claim 1, wherein the further firmware comprises a firmware kernel differing from at least one of the firmware and a different hardware abstraction layer.

13. A method of connecting a field device to a programmable logic controller (PLC), wherein the field device comprises a firmware having a plurality of functions, in which the method comprising:
receiving, by the field device, compatibility information from the PLC by means of a data interface; and
determining which functions of the firmware of the field device are known to the PLC using the compatibility information and releasing only a subset of the functions of the firmware that is known to the PLC for execution during an operation of the field device without booting. based on checking the received compatibility information one-by-one against a predetermined association of each of the plurality of the functions and a firmware version number or date that allows release of the function respectively, and
precluding functions, other than the subset of the functions, that currently reside on the field device from execution, based on the compatibility information to produce a behavior of the field device which is configured to adapt to the compatibility information and adopt a function and behavior of the field device with an older version of the firmware to conform to the current programming of the PLC, when the compatibility information does not require all of the functions of the firmware, and if none of the plurality of functions is suitable to produce the behavior of the field device configured to adapt to the compatibility information, to download a further firmware and to continue the operation of the field device with the further firmware by releasing further functions of the further firmware for execution simultaneously.

\* \* \* \* \*